United States Patent [19]

Park

[11] Patent Number: 5,360,964
[45] Date of Patent: Nov. 1, 1994

[54] MICROWAVE COFFEE MAKER HAVING A HOT PLATE HEATED BY MICROWAVES

[75] Inventor: Hwa S. Park, Kyungki, Rep. of Korea

[73] Assignee: Samsung Electronics Co., Ltd., Suwon, Rep. of Korea

[21] Appl. No.: 136,042

[22] Filed: Oct. 14, 1993

Related U.S. Application Data

[63] Continuation-in-part of Ser. No. 15,357, Feb. 9, 1993, Pat. No. 5,300,743.

[30] Foreign Application Priority Data

Feb. 17, 1992 [KR] Rep. of Korea ............ 9202264[U]

[51] Int. Cl.⁵ .................. H05B 6/80; A47J 31/00
[52] U.S. Cl. .................... 219/689; 219/759; 99/DIG. 14; 99/279
[58] Field of Search .......... 219/10.55 E, 10.55 F, 219/10.55 R, 759, 730, 689; 99/451, 279, 302 R, 306, DIG. 14

[56] References Cited

U.S. PATENT DOCUMENTS

| | | | |
|---|---|---|---|
| 3,662,141 | 5/1972 | Schauer, Jr. | 219/10.55 E |
| 3,783,220 | 1/1974 | Tanizaki | 219/10.55 E |
| 4,715,269 | 12/1987 | Stoner | 99/279 |
| 4,900,886 | 2/1990 | Bridges | 219/10.55 E |
| 4,908,222 | 3/1990 | Yu | 219/10.55 E |
| 4,999,470 | 3/1991 | Fuchs, Jr. | 219/10.55 E |
| 5,012,059 | 4/1991 | Boatman | 219/10.55 E |
| 5,028,753 | 7/1991 | Shariat | 219/10.55 E |

Primary Examiner—Philip H. Leung
Attorney, Agent, or Firm—Burns, Doane, Swecker & Mathis

[57] ABSTRACT

A microwave coffee maker includes a microwave generator for heating water. The heated water is discharged to a filtering vessel and then to a coffee container. The coffee container is mounted on a support plate on the underside of which is disposed a microwave absorbing material. That material is exposed to the microwaves and is heated thereby. The heat is conducted to the coffee container through the support plate to keep the coffee warm.

9 Claims, 2 Drawing Sheets

MICROWAVE COFFEE MAKER HAVING A HOT PLATE HEATED BY MICROWAVES

RELATED INVENTION

This is a continuation-in-part of U.S. Ser. No. 08/015,357, filed Feb. 9, 1993 and now U.S. Pat. No. 5,300,743, issued Apr. 5, 1994.

BACKGROUND OF THE INVENTION

The invention relates to a microwave coffee maker for producing a coffee beverage, in which water is boiled by induction heat from microwaves and discharged through a siphon.

Related Art

Generally, a microwave coffee maker is designed to heat a supply of water by means of induction heating using a magnetron, whereby the heated water flows into an upper filter box by means of a siphoning action and the coffee liquid produced through the filter box drips into a coffee container below.

However, this design is inconvenient where the coffee maker comprises a coffee container provided with a coffee filter box located thereabove, because the coffee liquid contained in the container boils up and overflows as heating progresses or conversely, the coffee liquid needs to be reheated when it cools over time. Also, in a microwave coffee maker as described above where the coffee maker comprises a magnetron generating microwaves and a high-voltage transformer supplying the necessary voltage for the magnetron, a significant amount of heat is produced and thus a cooling means using a propeller type air circulation device is necessary. The cooling means increases the number of electrical parts such as a cooling fan motor and so on, and thus the structure is more complicated and the cost of production rises as well as the noise from the fan motor.

The present invention was devised by considering the above matter, and it provides a microwave coffee maker capable of maintaining the special taste and flavor of brewed coffee by keeping the coffee container warm.

SUMMARY OF THE INVENTION

This is accomplished by providing a microwave absorbing material on the underside of a support plate which supports the coffee container and exposing that material to microwaves. The material is heated by the microwaves, and the heat is conducted to the support plate to keep the coffee warm.

BRIEF DESCRIPTION OF DRAWINGS

The objects and advantages of the invention will become apparent from the following detailed description of a preferred embodiment thereof in connection with the accompanying drawing in which like numerals designate like elements and in which.

DETAILED DESCRIPTION OF THE INVENTION

Figure 1:
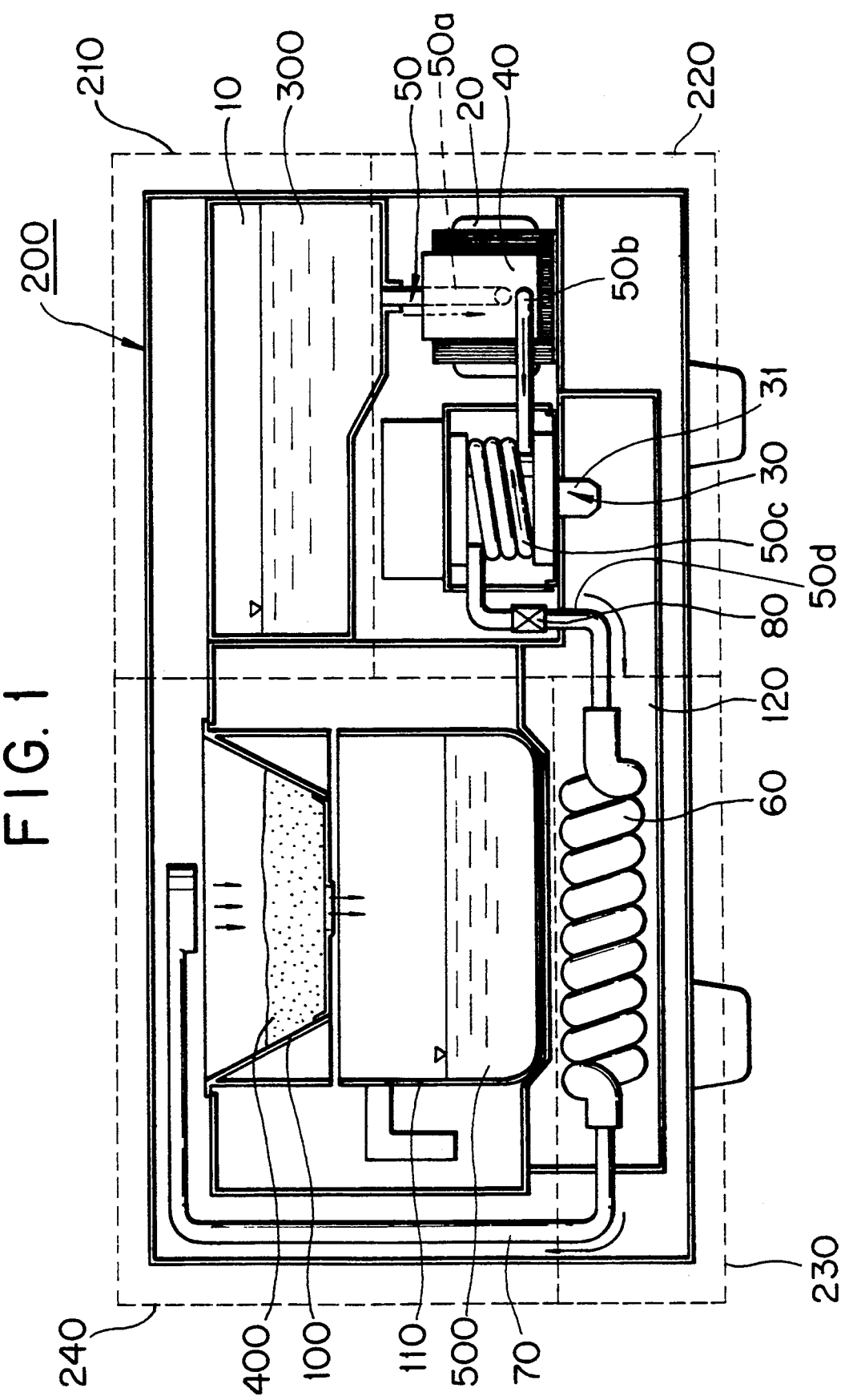
FIG. 1 is a vertical sectional view of a microwave coffee maker according to the present invention.
Figure 2:
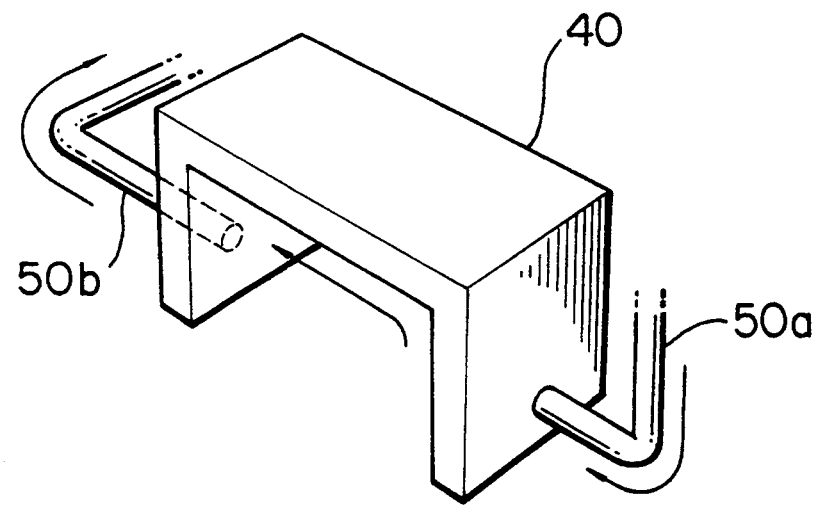
FIG. 2 is a perspective view of a transformer cooling member of the coffee maker.
Figure 3:
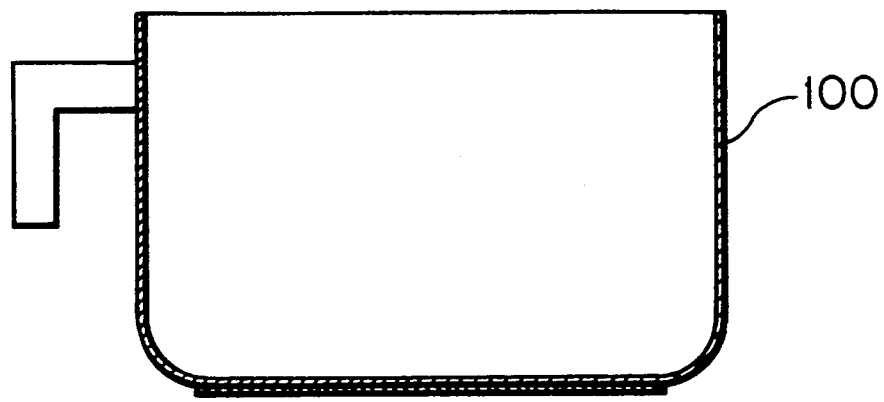
FIG. 3 is an enlarged fragmentary view of FIG. 1.

FIG. 1 is a complete structural view showing an embodiment of the present invention. A coffee maker 200 comprises four portions, namely, a water storing chamber 210, a mechanism chamber 220, a heating chamber 230 for heating water for making coffee and a coffee making chamber 240.

As shown in the right side of FIG. 1, the water storing chamber 210, installed above a mechanism chamber 220, holds water that is supplied from an exterior source. The mechanism chamber 220 is below a water storing tank 10, and a magnetron 30 and a high voltage transformer 20 are appropriately arranged therein.

The heating chamber 230 comprises a heating pipe 60 (helical pipe) transiently storing the water supplied from the water tank to be heated and them supplied to the coffee maker 240 through a siphon pipe 70, and an antenna 31 of the magnetron 30 generating a microwave therein.

The coffee making chamber 240 is provided with a coffee filtering vessel 100 directly receiving heated water from a water outlet of the heating chamber 230, and at the same time, accepting and filtering coffee, and a coffee container 110 for storing the coffee after it has passed through the filter vessel.

Details will now be explained more concretely as follows.

The high voltage transformer 20 generates high voltage, and the magnetron 30 produces microwaves from the high voltage. A U-shaped cooling member 40 surrounding the high voltage transformer 20 is connected to the lower part of said water storing tank 10 by a section 50a of a supplying pipe 50. Another section 50b of the heating pipe is connected to the other side of the member 40 and is joined to a helical segment 50c of the supplying pipe. The segment 50c winds around the magnetron 30 and is joined to a connecting segment 50d which connects to the heating pipe 60. The supply water 300 flows from the water storing tank through the supplying pipe and passes through the cooling member 40 which extends around the high voltage transformer 20 and then travels around the magnetron with the high voltage transformer 20 and the magnetron 30.

The water supply pipe segment 50c winding around the magnetron 30 is connected to the heating pipe 60 that is heated by the microwave generated from antenna 31. The heating pipe 60 is formed of a microwave permeable material including glass and plastic, such as polycarbonate. The heating pipe 60 is designed in a helical form in order to create more calories in a narrow area. The outlet side of the heating pipe 60 is connected to a siphon pipe 70 that is elongated in the upper section along a wall of the coffee container 110. And the pipe is designed to extend to the upper selection of the coffee filtering vessel 100, whereby the water supply water 300 heated in the heating pipe 60 drops into the coffee filtering vessel 100. It will be appreciated that the supplying pipe, cooling member 40, heating pipe 60, and siphon pipe 70 constitute portions of a water conduit arrangement extending between the tank 10 and the filtering vessel 100.

The coffee filtering vessel 100 is supplied with a lower section that can be centered for receiving the heated supply water 300 passing through the siphon pipe 70 and discharged through a projecting outlet toward the coffee container 110. Additionally, said coffee filtering vessel 100 is separate from the coffee container 110 to protect the water supply from backing up, or the coffee from overflowing. The coffee container rests in a recess 129 formed in a top side of a wall or support plate 132 which defines a ceiling of a section 120 of the heating chamber 230. Disposed on the underside of the support plate 132 beneath the recess 129 is a microwave absorbing material 130 such as ferrite powder. That material could be applied as a coating or the powder could be pressed into sheet form and bonded to the support plate by an adhesive. The material 130 is situated within the portion 120 of the heating chamber that receives microwaves from the antenna 30, and is heated thereby. The heat is conducted through the support plate to the coffee container 110.

The connecting segment 50d of the supply pipe 50 contains a reverse flow preventing valve 80 to prevent a reverse flow of the supply water 300 caused by the increase in pressure as it is heated.

The supply water 300 of the microwave coffee maker according to the present invention circulates around the high voltage transformer 20 and the magnetron 30 and exchanges heat with them to cool them. And simultaneously, the water absorbs the heat and rises in temperature to be supplied into the heating pipe 60 in the heated condition. Because its temperature is increased, the supply water in the heating pipe 60 is quickly heated by the microwaves generated from the antenna 31 of the magnetron. The water pressure rises according to the temperature increases. The water is prevented from backing up into the mechanism chamber 220 by the valve 80 and is expelled into the low pressure siphon pipe 70 and flows into the coffee filtering vessel 100 and through the coffee powder 400. The coffee liquid 500 flows into the coffee container 110 for storage.

During this process, the material 130 is heated by microwaves and that heat is transferred to the support plate 132 which thus constitutes a hot plate. The hot plate is also heated by heat convection from the coil 60. The magnetron can be kept energized so that the microwaves continue to heat the material 130 even after the water has been discharged to the filtering vessel 100, thereby keeping the coffee warm.

The microwave coffee maker according the present invention, as described above, is simple in design because it uses the supply water to cool the high voltage transformer and the magnetron and thus the need for a separate cooling fan or a motor for cooling is eliminated, and also the noise emitted from the motor is avoided. Especially, its design can lower the cost of production and the supply water for coffee is more quickly heated, because it flows into the heating chamber in the heated, state, rather than being directly heated, and thus the energy consumption is reduced.

Additionally, the microwave absorbing/heating material 130 formed on the bottom of the support plate 132 uses the microwaves of the heating chamber to keep the coffee warm. This removes the inconvenience of reheating coffee after it cools and also raises the satisfaction of the consumer by maintaining the special taste and flavor of coffee.

Although the present invention has been described in connection with preferred embodiments thereof, it will be appreciated by those skilled in the art that additions, deletions, modifications, and substitutions not specifically described may be made without departing from the spirit and scope of the invention as defined in the appended claims.

I claim:
1. A microwave coffee maker comprising:
a heating chamber including a heating pipe for receiving and conducting water;
microwave generating means for generating microwaves to heat water in said heating pipe;
a siphon pipe connected to said heating pipe for siphoning the heated water to a water outlet situated outside of said heating chamber and isolated from microwaves generated by said microwave generating means;
a coffee filtering vessel removably positionable beneath said water outlet for receiving water therefrom;
a support plate disposed beneath said coffee filtering vessel and including an upper side for supporting thereon a coffee container to collect coffee from said coffee filtering vessel, said upper side situated outside of said heating chamber and being isolated from microwaves generated by said microwave generating means, said support plate including an underside situated beneath said upper side; and
a microwave absorbing material disposed on said underside of said support plate and exposed to microwaves from said microwave generating means for being heated thereby and conducting heat to said upper side for keeping the coffee warm.

2. A microwave coffee maker according to claim 1 wherein said microwave absorbing material comprises a sheet which is bonded to said underside.

3. A microwave coffee maker according to claim 1, wherein said microwave absorbing material is applied to said underside as a coating.

4. A microwave coffee maker according to claim 1 wherein said microwave absorbing material is disposed in said heating chamber.

5. A microwave coffee maker according to claim 4 wherein said heating pipe is disposed beneath said microwave absorbing material.

6. A microwave coffee maker according to claim 1 wherein said upper side of said support plate includes a recess for receiving a coffee container, said microwave absorbing material disposed beneath said recess.

7. A microwave coffee maker according to claim 1 including a housing forming said heating chamber, said heating pipe being fixedly connected to said housing.

8. A microwave coffee maker comprising:
a heating chamber;
a microwave generator for directing microwaves into said heating chamber, said microwave generator including a magnetron and a transformer;
a water conducting conduit including:
an inlet end for connection with a supply of water to be heated,
an outlet end for discharging heated water,
a helically coiled heating section disposed between said inlet end and said outlet end and situated in said heating chamber, said heating section formed of a microwave permeable material so that water traveling therethrough is heated by microwaves in said heating chamber,
a siphon section disposed between said heating section and said outlet end for siphoning the heated water to said outlet end, and
a heat exchange section disposed between said inlet end and said heating section and arranged in heat exchanging relationship with said transformer and said magnetron for transferring heat from said transformer and said magnetron to water flowing through said heat exchange section;

a coffee filtering vessel removably positionable beneath said outlet end for receiving heated water therefrom;

a support plate disposed beneath said coffee filtering vessel and including an upper side for supporting thereon a coffee container to collect coffee from said coffee filtering vessel, said upper side situated outside of said heating chamber and isolated from microwaves therein, said support plate including an underside situated beneath said upper side; and a microwave absorbing material disposed on said underside of said support plate and exposed to microwaves for being heated thereby and conducting heat to said upper side for keeping the coffee warm.

9. A microwave coffee maker according to claim 8, wherein said underside forms an upper portion of said heating chamber and is disposed above said heating section of said conduit.

* * * * *